(12) United States Patent
Miao (10) Patent No.: US 11,031,877 B2
(45) Date of Patent: Jun. 8, 2021

(54) SYNCHRONOUS RECTIFIERS WITH REDUCED POWER LOSS AND THE METHOD THEREOF

(71) Applicant: Chengdu Monolithic Power Systems Co. Ltd., Chengdu (CN)

(72) Inventor: Lei Miao, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/510,804

(22) Filed: Jul. 12, 2019

(65) Prior Publication Data

US 2020/0028441 A1 Jan. 23, 2020

(30) Foreign Application Priority Data

Jul. 18, 2018 (CN) .......................... 201810791903.4

(51) Int. Cl.
 *H02M 3/335* (2006.01)
 *H02M 1/00* (2006.01)
(52) U.S. Cl.
 CPC ... *H02M 3/33592* (2013.01); *H02M 3/33507* (2013.01); *H02M 2001/0032* (2013.01)
(58) Field of Classification Search
 CPC .............................................. H02M 3/33592
 See application file for complete search history.

(56) References Cited

U.S. PATENT DOCUMENTS

| 5,774,350 | A | * | 6/1998 | Notaro | H02M 3/33592 363/127 |
|---|---|---|---|---|---|
| 8,102,680 | B2 | | 1/2012 | Ren et al. | |
| 9,407,151 | B2 | | 8/2016 | Zhang et al. | |
| 2011/0012538 | A1 | * | 1/2011 | Ren | H02M 3/33592 315/307 |
| 2018/0054132 | A1 | * | 2/2018 | Ptacek | H02M 3/33592 |
| 2019/0229634 | A1 | * | 7/2019 | Moon | H02M 1/08 |

FOREIGN PATENT DOCUMENTS

CN    106208714 B  * 12/2016

OTHER PUBLICATIONS

U.S. Appl. No. 16/022,645, filed Jun. 28, 2018, Chengdu Monolithic Power Systems.
U.S. Appl. No. 16/195,712, filed Nov. 19, 2018, Chengdu Monolithic Power Systems.
U.S. Appl. No. 16/285,102, filed Feb. 25, 2019, Chengdu Monolithic Power Systems.
U.S. Appl. No. 16/442,439, filed Jun. 14, 2019, Monolithic Power Systems.

* cited by examiner

*Primary Examiner* — Peter M Novak
(74) *Attorney, Agent, or Firm* — Perkins Coie LLP (57) ABSTRACT

A synchronous rectifier monitors a driven signal of a synchronous switch. If the driven signal is provided within a set time length, the driven signal is latched off, to make the system enter light load mode.

17 Claims, 6 Drawing Sheets

SYNCHRONOUS RECTIFIERS WITH REDUCED POWER LOSS AND THE METHOD THEREOF

CROSS-REFERENCE TO RELATED APPLICATIONS

This application claims priority to and the benefit of Chinese Patent Application No. 201810791903.4, filed Jul. 18, 2018, which is incorporated herein by reference in its entirety.

FIELD

The present invention relates to electronic circuits, more specifically, the present invention relates to switching regulators and the control thereof.

BACKGROUND

With the development of electronic technology, synchronous rectifier (SR) are widely used in notebook power adapters, wireless telecom SMPS, liquid crystal display power managements, Ethernet power supplies, and etc. for the high conversion efficiency.

Figure 1:
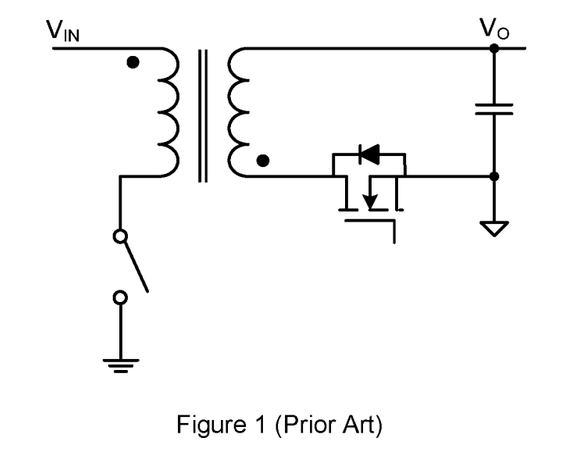
FIG. 1 schematically shows a typical flyback converter.
Figure 2:
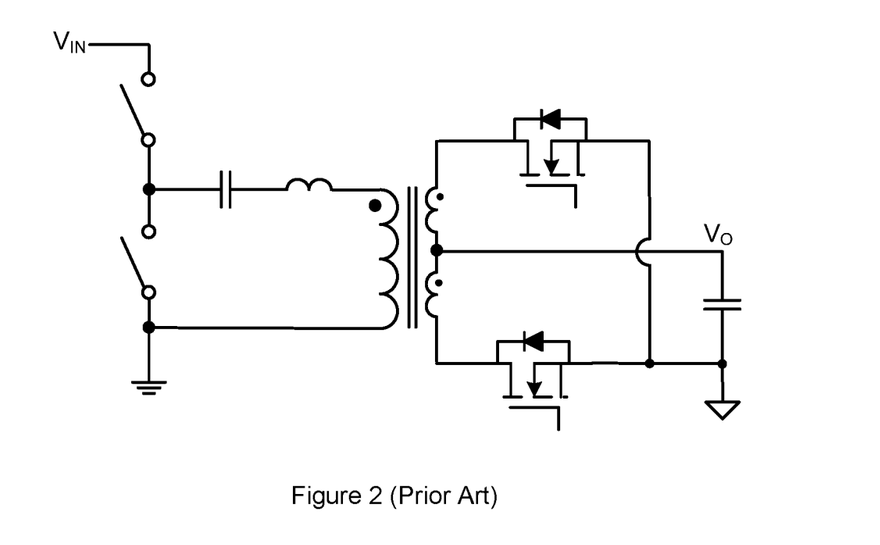
FIG. 2 schematically shows a typical LC/LLC converter.

In a typical synchronous rectifier, an input voltage is received at primary side of a transfer, and a power diode is replaced by a controllable power switch in secondary side of the transformer. Typically, the topology of a synchronous rectifier comprises a flyback converter as shown in FIG. 1, or a LC and/or a LLC converter as shown in FIG. 2. The controllable power switch may comprise MOSFETs.

However, higher efficiency and better performance are always in demand in the field.

SUMMARY

In accomplishing the above and other objects, there has been provided, in accordance with an embodiment of the present invention, a synchronous rectifier used in an electronic circuit, wherein the electronic circuit has a transformer including a primary winding and a secondary winding, the synchronous rectifier comprising: a synchronous switch, coupled to the secondary winding of the transformer, the synchronous switch being controlled to be periodically turned on and turned off in response to a driven signal to convert an input voltage to an output voltage; wherein the driven signal is latched off if the driven signal is not provided within a first set time period, so as to have the synchronous rectifier enter light load mode.

In addition, there has been provided, in accordance with an embodiment of the present invention, a synchronous rectifier used in an electronic circuit, wherein the electronic circuit has a transformer including a primary winding and a secondary winding, the synchronous rectifier comprising: a synchronous switch, coupled to the secondary winding of the transformer, the synchronous switch being periodically turned on and turned off in response to a driven signal to convert an input voltage to an output voltage; and a light load comparator, configured to compare the driven signal with a light load voltage threshold, wherein the driven signal is latched off if the driven signal is lower and remains lower than the light load voltage threshold for a first set time period, so as to have the synchronous rectifier enter light load mode.

Furthermore, there has been provided, in accordance with an embodiment of the present invention, a synchronous rectifying method used in an electronic circuit, comprising: receiving an input voltage at a primary side of a transformer; periodically turning on and turning off a synchronous switch in response to a driven signal, to generate an output voltage; and monitoring the driven signal, if the driven signal is not provided within a first set time period, latching off the driven signal, to have the electronic circuit enter light load mode; otherwise, continuing periodically turning on and turning off the synchronous switch.

The use of the similar reference label in different drawings indicates the same of like components.

DETAILED DESCRIPTION

Embodiments of circuits for synchronous rectifier are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 3:
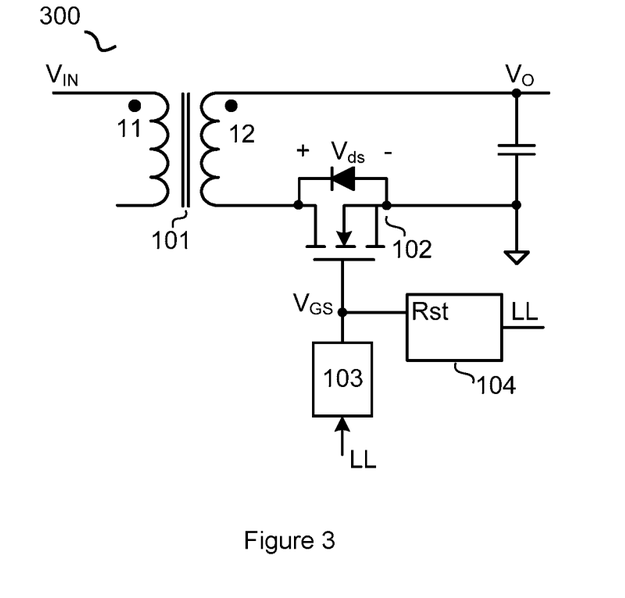
FIG. 3 schematically shows a synchronous rectifier 300 in accordance with an embodiment of the present invention.

FIG. 3 schematically shows a synchronous rectifier 300 in accordance with an embodiment of the present invention. In one embodiment, the synchronous rectifier 300 is used in an electronic circuit. The electronic circuit may comprise a transformer including a primary winding and a secondary winding. In the embodiment of FIG. 3, the synchronous rectifier 300 comprises: a synchronous switch 102, coupled to a secondary winding 12 of a transformer 101, the synchronous switch 102 being controlled to be periodically turned on and turned off in response to a driven signal VGS, to convert an input voltage VIN to an output voltage VO; wherein the driven signal VGS is latched off if the driven signal VGS is not provided within a first set time period TLL (i.e., if no driven signal VGS shows up in the synchronous rectifier 100 for the first set time period TLL), so as to have the synchronous rectifier 300 enter light load mode.

In one embodiment, the input voltage VIN is received at a primary winding 11 of the transformer 101.

In one embodiment, the driven signal VGS is generated by a logical and driven circuit 103.

In one embodiment, the synchronous rectifier 300 further comprises: a first timer 104, configured to be reset by the driven signal VGS. The first timer 104 keeps timing if the synchronous rectifier 100 does not provide the driven signal VGS to reset it. And if a period of time of the timing reaches the first set time period TLL, the logical and driven circuit 103 is disabled by a light load signal LL generated by the first timer 104, so that the driven signal VGS is latched off.

In one embodiment, the primary side of the transformer 101 may be configured as flyback circuit, e.g., the synchronous rectifier may comprise a flyback converter shown in FIG. 1. In another embodiment, the primary side of the transformer 101 may be configured as LC/LLC circuit, e.g., the synchronous rectifier may comprise a LC/LLC converter shown in FIG. 2. Thus, the input voltage VIN may comprise a square wave signal.

In one embodiment, the synchronous switch 102 comprises a MOSFET having a body diode. However, one skilled in the art should realize that the synchronous switch 102 may comprise other controllable power devices, such as IGBT, BJT, etc.

Figure 4:
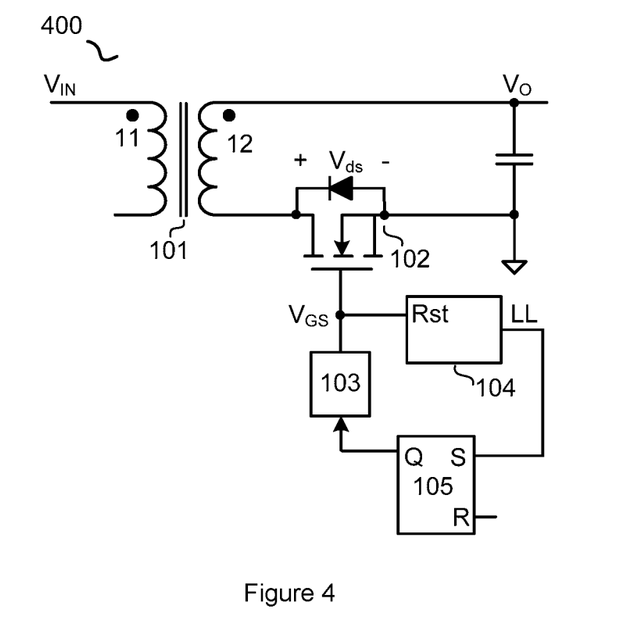
FIG. 4 schematically shows a synchronous rectifier 400 in accordance with an embodiment of the present invention.

FIG. 4 schematically shows a synchronous rectifier 400 in accordance with an embodiment of the present invention. The synchronous rectifier 400 shown in FIG. 4 is similar to the synchronous rectifier 300 in FIG. 3, with a difference that in the embodiment of FIG. 4, the synchronous rectifier 400 further comprises: a latch 105, wherein the light load signal LL is operable to disable the logical and driven circuit 103 by way of the latch 105.

In one embodiment, the latch 105 comprises a RS flip flop. The RS flip flop is set if the driven signal VGS is not provided within the first set time period TLL. Then the logical and driven circuit 103 is disabled, and the driven signal VGS is latched off.

Figure 5:
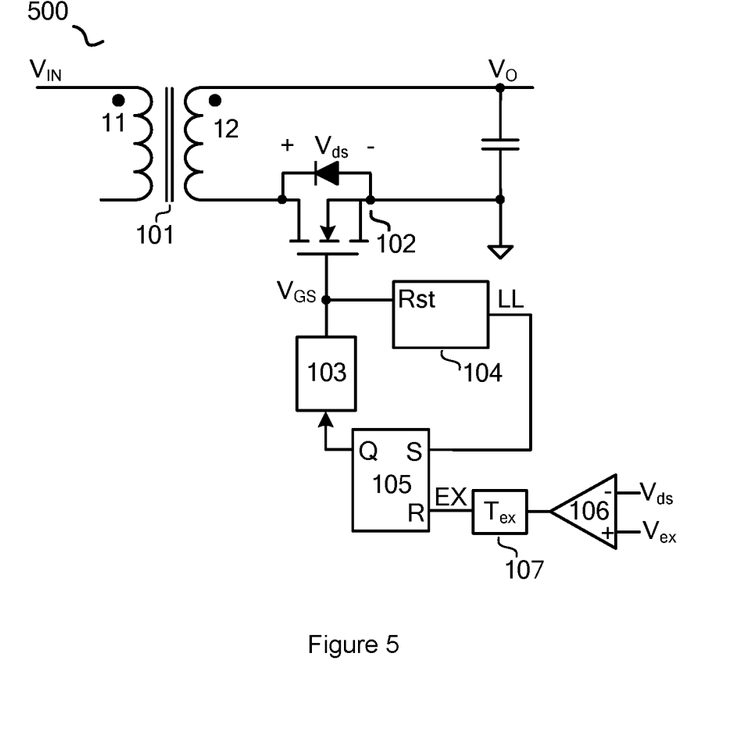
FIG. 5 schematically shows a synchronous rectifier 500 in accordance with an embodiment of the present invention.

FIG. 5 schematically shows a synchronous rectifier 500 in accordance with an embodiment of the present invention. The synchronous rectifier 500 shown in FIG. 5 is similar to the synchronous rectifier 400 in FIG. 4, with a difference that in the embodiment of FIG. 5, the synchronous rectifier 500 further comprises: an exit comparator 106, configured to compare a voltage Vds across the synchronous switch 102 with an exit voltage threshold Vex, if the voltage Vds across the synchronous switch 102 is lower and remains lower than the exit voltage threshold Vex for a second set time period Tex, the driven signal VGS is released, and the synchronous rectifier 500 exits light load mode.

In one embodiment, if the voltage Vds remains lower than the exit voltage threshold Vex for the second set time period Tex, an exit signal EX is generated by the exit comparator 106, to reset the RS flip flop and release the logical and driven circuit 103.

In one embodiment, the synchronous rectifier 400 further comprises: a second timer 107, configured to start timing when the voltage Vds is lower than the exit voltage threshold Vex. If the voltage Vds remains lower than the exit voltage threshold Vex within the second set time period Tex, a period of time of the timing reaches the second set time period. Consequently, the RS flip flop is reset, and the logical and driven circuit 103 is released.

Figure 6:
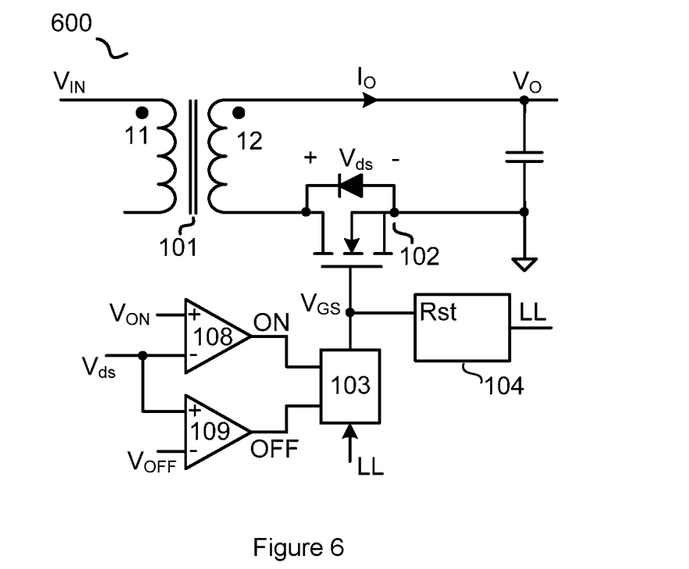
FIG. 6 schematically shows a synchronous rectifier 600 in accordance with an embodiment of the present invention.

FIG. 6 schematically shows a synchronous rectifier 600 in accordance with an embodiment of the present invention. The synchronous rectifier 600 shown in FIG. 6 is similar to the synchronous rectifier 300 in FIG. 3, with a difference that in the embodiment of FIG. 6, the synchronous rectifier 600 further comprises: an amplifier 108, configured to generate a turn-on signal ON by amplifying a difference between the voltage Vds across the synchronous switch 102 and a turn-on voltage threshold VON; and a turn-off comparator 109, configured to generate a turn-off signal OFF by comparing the voltage Vds across the synchronous switch 102 with a turn-off voltage threshold VOFF, wherein the driven signal VGS is generated in response to the turn-on signal ON and the turn-off signal OFF; and wherein the synchronous switch 102 is started to be gradually turned on when the voltage Vds across the synchronous switch 102 is lower than the turn-on voltage threshold VON, and is turned off when the voltage Vds across the synchronous switch 102 is higher than the turn-off voltage threshold VOFF.

In one embodiment, the amplifier 108 may be replaced by a comparator. That is, in the embodiment of FIG. 6, the synchronous rectifier 600 may further comprise: a turn-on comparator 108, configured to generate a turn-on signal ON by comparing the voltage Vds across the synchronous switch 102 with a turn-on voltage threshold VON; and a turn-off comparator 109, configured to generate a turn-off signal OFF by comparing the voltage Vds across the synchronous switch 102 with a turn-off voltage threshold VOFF, wherein the driven signal VGS is generated in response to the turn-on signal ON and the turn-off signal OFF; and wherein the synchronous switch 102 is turned on when the voltage Vds across the synchronous switch 102 is lower than the turn-on voltage threshold VON, and is turned off when the voltage Vds across the synchronous switch 102 is higher than the turn-off voltage threshold VOFF.

During the operation of the synchronous rectifier, when an induced voltage of the secondary winding 12 forces the body diode of the synchronous switch 102 to be on, the voltage Vds across the synchronous switch 102 is equal to the voltage drop of its body diode, with a negative polarity. At the amplifier 108, this negative voltage Vds is lower than the turn-on voltage threshold VON. Thus, the turn-on signal ON starts to increase, which gradually turns on the synchronous switch 102 from OFF status. Consequently, energy is delivered to the secondary side of the transformer, and the desired output voltage VO is generated. With the increase of the turn-on signal ON, the turn-on resistance of the synchronous switch 102 decreases. At the secondary side of the transformer 101, the secondary winding 12, the output capacitor and the synchronous switch 102 form a current loop; and the secondary current 10 flows in the shown direction. When the synchronous switch 102 is fully turned on, the secondary current 10 starts to decrease. The voltage Vds across the synchronous switch 102 within this process is negative. When the secondary current 10 decreases to zero and turns to an opposite direction, the voltage Vds turns to be positive. At the amplifier 108, the turn-on signal ON starts to decrease, so does the driven signal VGS. Accordingly, the turn-on resistance of the synchronous switch 102 increases, so does the voltage Vds across the synchronous switch 102. When the voltage Vds reaches the turn-off voltage threshold VOFF, the synchronous switch 102 is turned off by the turn-off signal OFF by way of the logical and driven circuit 103.

Figure 7:
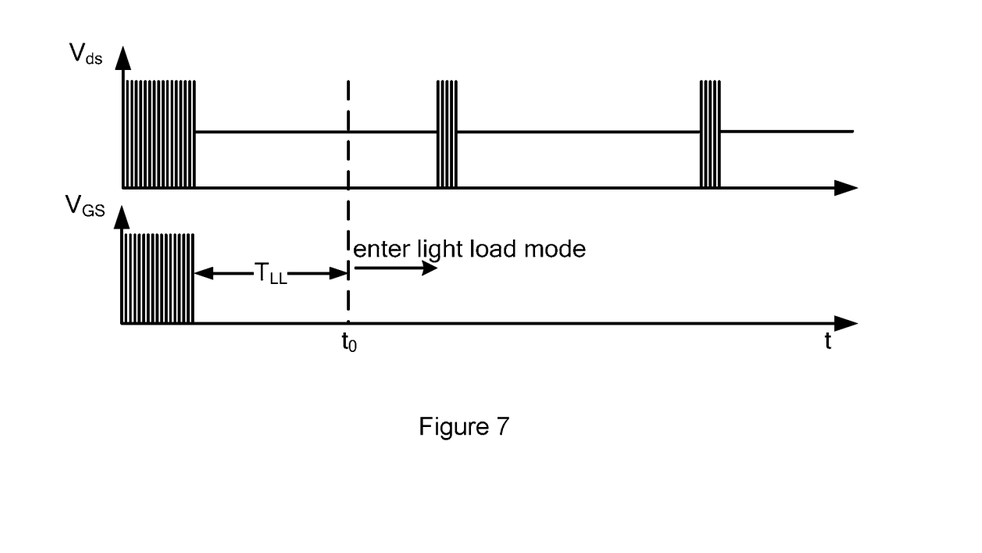
FIG. 7 schematically shows the timing waveforms of the voltage Vds across the synchronous switch 102 and the driven signal VGS within the process that the load becomes lighter and the synchronous rectifier enters light load mode.

If the load becomes lighter, the secondary current 10 decreases. If the synchronous rectifier enters light load condition, no more driven signal VGS is provided. If the driven signal VGS is not provided within the first set time period TLL, the logical and driven circuit 103 would be disabled by the light load signal LL. Then no new driven signal VGS would be generated by the logical and driven circuit 103, i.e., the driven signal VGS is latched off. As a result, the synchronous rectifier enters light load mode, and the synchronous switch 102 is turned off for a long time. Consequently, the power loss is reduced and the efficiency is improved. The timing waveforms of the voltage Vds across the synchronous switch 102 and the driven signal VGS during above process refer to FIG. 7. As shown in FIG. 7, the synchronous rectifier enters the light load mode at time point t0.

Figure 8:
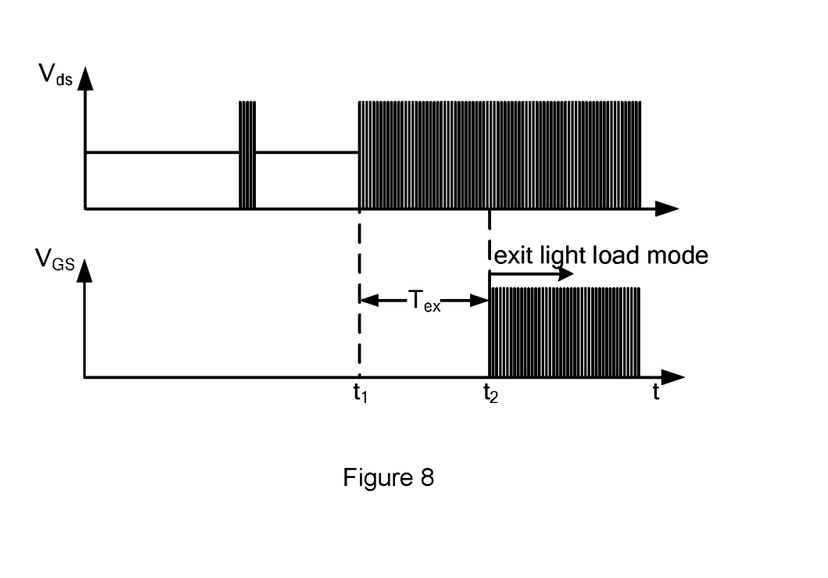
FIG. 8 schematically shows the timing waveforms of the voltage Vds across the synchronous switch 102 and the driven signal VGS within the process that the load becomes heavier and the synchronous rectifier exits light load mode.

If the load becomes heavier under light load mode, current would flow through the secondary side. Because of the latch-off of the driven signal VGS, the synchronous switch 102 is off. Thus the secondary current I0 flows through the body diode of the synchronous switch 102, forcing the voltage Vds to be equal to the voltage drop of the body diode, which is negative. This negative voltage is then detected and compared with the exit voltage threshold Vex by the exit comparator 106. When the voltage Vds is lower than the exit voltage threshold Vex, the second timer 107 starts timing. If the voltage Vds remains lower than the exit voltage threshold Vex within the second set time period Tex, the logical and driven circuit 103 is released by the exit signal EX. Consequently, a new driven signal VGS is generated, and the synchronous switch 102 is controlled to be periodically turned on and turned off again, i.e., the synchronous rectifier exits light load mode. The timing waveforms of the voltage Vds across the synchronous switch 102 and the driven signal VGS during above process refer to FIG. 8. As shown in FIG. 8, the load starts to become heavier at time point t1; but until time point t2, i.e., until the time length that the voltage Vds remains lower than the exit voltage threshold Vex reaches the second set time period Tex, the synchronous rectifier exits the light load mode, so that the synchronous rectifier is prevented from repeatedly entering and exiting light load mode caused by disturbance.

Figure 9:
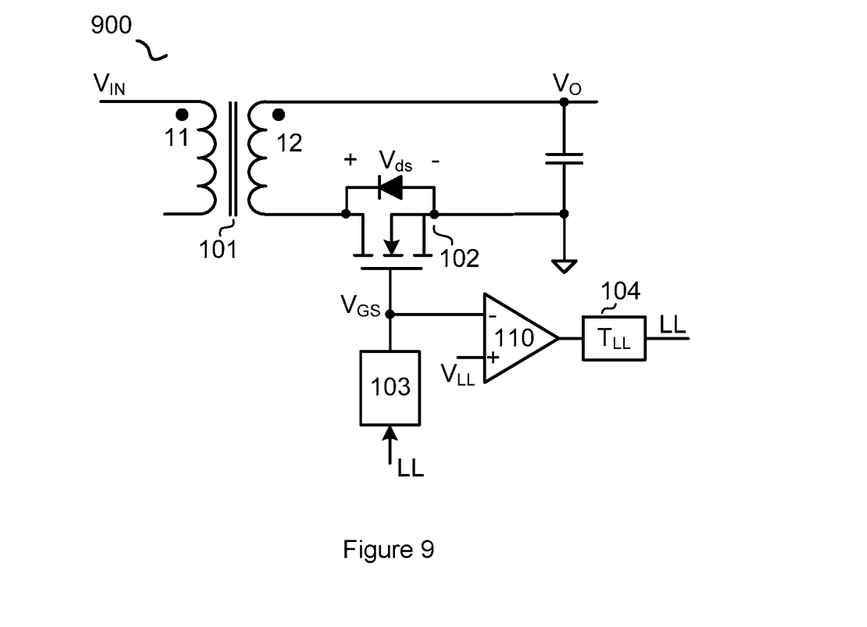
FIG. 9 schematically shows a synchronous rectifier 900 in accordance with an embodiment of the present invention.

FIG. 9 schematically shows a synchronous rectifier 900 in accordance with an embodiment of the present invention. In one embodiment, the synchronous rectifier 900 is used in an electronic circuit. The electronic S circuit may comprise a transformer including a primary winding and a secondary winding. In the embodiment of FIG. 9, the synchronous rectifier 900 comprises: a synchronous switch 102, coupled to a secondary winding 12 of a transformer 101, the synchronous switch 102 being periodically turned on and turned off in response to a driven signal VGS, to convert an input voltage VIN to an output voltage VO; and a light load comparator 110, configured to compare the driven signal VGS with a light load voltage threshold VLL, wherein the driven signal VGS is latched off if the driven signal VGS is lower and remains lower than the light load voltage threshold VLL for a first set time period TLL, so as to have the synchronous rectifier 900 enter light load mode.

In one embodiment, the input voltage VIN is received at a primary winding 11 of the transformer 101.

In one embodiment, the driven signal VGS is generated by a logical and driven circuit 103.

In one embodiment, the synchronous rectifier 900 further comprises: a first timer 104, configured to start timing when the driven signal VGS is lower than the light load voltage threshold VLL. If the driven signal VGS remains lower than the light load voltage threshold VLL for the first set time period TLL, i.e., a time length of the timing reaches the first set time period, a light load signal LL is generated, to disable the logical and driven circuit 103, and to latch off the driven signal VGS.

The operation of the synchronous rectifier 900 is similar to the synchronous rectifier discussed above, which will not be discussed for brevity.

Figure 10:
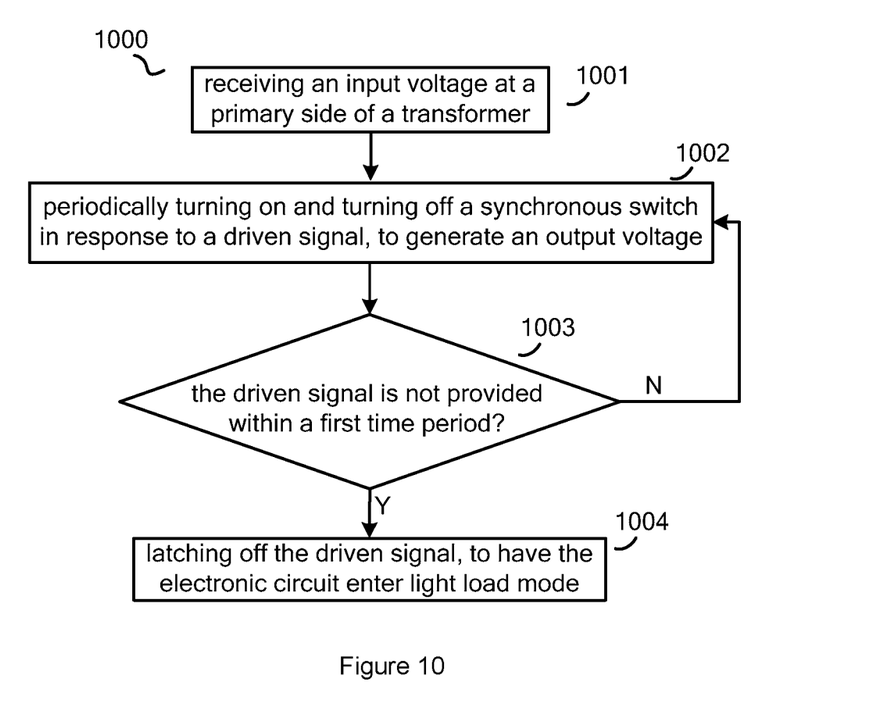
FIG. 10 schematically shows a flowchart 1000 of a synchronous rectifying method.

FIG. 10 schematically shows a flowchart 1000 of a synchronous rectifying method used in an electronic circuit. The method comprising:

Step 1001, receiving an input voltage at a primary side of a transformer.

Step 1002, periodically turning on and turning off a synchronous switch in response to a driven signal, to generate an output voltage. In one embodiment, the synchronous switch is coupled to a secondary side of the transformer.

Step 1003, monitoring the driven signal, if the driven signal is not provided within a first set time period, going to step 1004; otherwise, jumping back to step 1002. And Step 1004, latching off the driven signal, to have the electronic circuit enter light load mode.

In one embodiment, the method further comprising: monitoring a voltage across the synchronous switch, if the voltage across the synchronous switch is lower and remains lower than an exit voltage threshold for a second set time period, releasing the driven signal, to let the electronic circuit exit the light load mode.

In one embodiment, the driven signal is generated based on the voltage across the synchronous switch. Specifically, in one embodiment, the method further comprises: amplifying a difference between the voltage across the synchronous switch and a turn-on voltage threshold, to generate a turn-on signal; comparing the voltage across the synchronous switch with a turn-off voltage threshold, to generate a turn-off signal; and generating the driven signal in response to the turn-on signal and the turn-off signal. When the voltage across the synchronous switch is lower than the turn-on voltage threshold, the synchronous switch is gradually turned on; and when the voltage across the synchronous switch is higher than the turn-off voltage threshold, the synchronous switch is turned off.

In one embodiment, the driven signal is generated based on the voltage across the synchronous switch. Specifically, in one embodiment, the method further comprises: comparing the voltage across the synchronous switch with a turn-on voltage threshold, to generate a turn-on signal; comparing the voltage across the synchronous switch with a turn-off voltage threshold, to generate a turn-off signal; and generating the driven signal in response to the turn-on signal and the turn-off signal. When the voltage across the synchronous switch is lower than the turn-on voltage threshold, the synchronous switch is turned on; and when the voltage across the synchronous switch is higher than the turn-off voltage threshold, the synchronous switch is turned off.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A synchronous rectifier used in an electronic circuit, wherein the electronic circuit has a transformer including a primary winding and a secondary winding, the synchronous rectifier comprising:
   a synchronous switch, coupled to the secondary winding of the transformer, the synchronous switch being controlled to be periodically turned on and turned off in response to a driven signal to convert an input voltage to an output voltage; and
   a first timer, configured to detect a light load condition by detecting a provision and/or absent status of the driven signal, wherein the first timer is reset by the driven signal, and wherein if the driven signal is not provided within a first set time period, the first timer is configured to generate a light load signal to disable a logical and driven circuit and latch off the driven signal, so as to have the synchronous rectifier enter light load mode.

2. The synchronous rectifier of claim 1, further comprising: a latch, wherein the light load signal is operable to disable the logical and driven circuit by way of the latch.

3. The synchronous rectifier of claim 1, further comprising:
   an exit comparator, configured to compare a voltage across the synchronous switch with an exit voltage threshold, wherein if the voltage across the synchronous switch is lower and remains lower than the exit voltage threshold for a second set time period, the driven signal is released, and the synchronous rectifier exits light load mode.

4. The synchronous rectifier of claim 3, further comprising:
   a second timer, configured to start a timing when the voltage across the synchronous switch is lower than the exit voltage threshold; wherein if a period of time of the timing reaches the second set time period, the driven signal is released.

5. The synchronous rectifier of claim 1, further comprising:
   a turn-on comparator, configured to generate a turn-on signal by comparing a voltage across the synchronous switch with a turn-on voltage threshold; and
   a turn-off comparator, configured to generate a turn-off signal by comparing the voltage across the synchronous switch with a turn-off voltage threshold;
   wherein the driven signal is generated in response to the turn-on signal and the turn-off signal.

6. The synchronous rectifier of claim 1, further comprising:
   an amplifier, configured to generate a turn-on signal by amplifying a difference between a voltage across the synchronous switch and a turn-on voltage threshold; and
   a turn-off comparator, configured to generate a turn-off signal by comparing the voltage across the synchronous switch with a turn-off voltage threshold;
   wherein the driven signal is generated in response to the turn-on signal and the turn-off signal.

7. A synchronous rectifier used in an electronic circuit, wherein the electronic circuit has a transformer including a primary winding and a secondary winding, the synchronous rectifier comprising:
   a synchronous switch, coupled to the secondary winding of the transformer, the synchronous switch being periodically turned on and turned off in response to a driven signal to convert an input voltage to an output voltage; and
   a light load comparator, configured to compare the driven signal with a light load voltage threshold to detect a light load condition, wherein the driven signal is latched off if the driven signal is lower and remains lower than the light load voltage threshold for a first set time period, so as to have the synchronous rectifier enter light load mode.

8. The synchronous rectifier of claim 7, further comprising:
   a first timer, configured to start a timing when the driven signal is lower than the light load voltage threshold, wherein if the driven signal remains lower than the light load voltage threshold for the first set time period, a light load signal is generated, to disable a logical and driven circuit and latch off the driven signal.

9. The synchronous rectifier of claim 8, further comprising:
   a latch, wherein the light load signal is operable to disable the logical and driven circuit by way of the latch.

10. The synchronous rectifier of claim 7, further comprising:
    an exit comparator, configured to compare a voltage across the synchronous switch with an exit voltage threshold, wherein if the voltage across the synchronous switch is lower and remains lower than the exit voltage threshold for a second set time period, the driven signal is released, and the synchronous rectifier exits light load mode.

11. The synchronous rectifier of claim 10, further comprising:
    a second timer, configured to start a timing when the voltage across the synchronous switch is lower than the exit voltage threshold; wherein if a period of time of the timing reaches the second set time period, the driven signal is released.

12. The synchronous rectifier of claim 7, further comprising:
    a turn-on comparator, configured to generate a turn-on signal by comparing a voltage across the synchronous switch with a turn-on voltage threshold; and
    a turn-off comparator, configured to generate a turn-off signal by comparing the voltage across the synchronous switch with a turn-off voltage threshold; wherein
    the driven signal is generated in response to the turn-on signal and the turn-off signal.

13. The synchronous rectifier of claim 7, further comprising:
    an amplifier, configured to generate a turn-on signal by amplifying a difference between a voltage across the synchronous switch and a turn-on voltage threshold; and
    a turn-off comparator, configured to generate a turn-off signal by comparing the voltage across the synchronous switch with a turn-off voltage threshold; wherein
    the driven signal is generated in response to the turn-on signal and the turn-off signal.

14. A synchronous rectifying method used in an electronic circuit, comprising:
    receiving an input voltage at a primary side of a transformer;
    periodically turning on and turning off a synchronous switch in response to a driven signal, to generate an output voltage; and
    monitoring the driven signal to detect a provision and/or absent status of the driven signal to detect a light load condition, if the driven signal is not provided within a first set time period, latching off the driven signal, to have the electronic circuit enter light load mode; otherwise, continuing periodically turning on and turning off the synchronous switch.

15. The synchronous rectifying method of claim 14, further comprising:
monitoring a voltage across the synchronous switch, if the voltage across the synchronous switch is lower and remains lower than an exit voltage threshold for a second set time period, releasing the driven signal, to let the electronic circuit exit the light load mode.

16. The synchronous rectifying method of claim 14, further comprising:
amplifying a difference between a voltage across the synchronous switch and a turn-on voltage threshold, to generate a turn-on signal;
comparing the voltage across the synchronous switch with a turn-off voltage threshold, to generate a turn-off signal; and
generating the driven signal in response to the turn-on signal and the turn-off signal.

17. The synchronous rectifying method of claim 14, further comprising:
comparing the voltage across the synchronous switch with a turn-on voltage threshold, to generate a turn-on signal;
comparing the voltage across the synchronous switch with a turn-off voltage threshold, to generate a turn-off signal; and
generating the driven signal in response to the turn-on signal and the turn-off signal.

* * * * *